United States Patent
Hopper et al.

(10) Patent No.: US 7,180,379 B1
(45) Date of Patent: Feb. 20, 2007

(54) LASER POWERED CLOCK CIRCUIT WITH A SUBSTANTIALLY REDUCED CLOCK SKEW

(75) Inventors: Peter J. Hopper, San Jose, CA (US); Philipp Lindorfer, San Jose, CA (US); Vladislav Vashchenko, Palo Alto, CA (US); Yuri Mirgorodski, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 33 days.

(21) Appl. No.: 10/838,485

(22) Filed: May 3, 2004

(51) Int. Cl.
    *G01N 21/00* (2006.01)
(52) U.S. Cl. .......................................... 331/66; 257/458
(58) Field of Classification Search .................. 331/66; 257/458
    See application file for complete search history.

(56) References Cited

U.S. PATENT DOCUMENTS

| | | | | |
|---|---|---|---|---|
| 4,542,289 A | * | 9/1985 | Yokoyama et al. | 250/201.7 |
| 4,544,938 A | * | 10/1985 | Scholl | 257/435 |
| 5,442,475 A | * | 8/1995 | Bausman et al. | 398/155 |
| 5,521,736 A | * | 5/1996 | Swirhun et al. | 398/154 |
| 5,889,903 A | * | 3/1999 | Rao | 385/14 |
| 6,653,706 B1 | * | 11/2003 | Miller et al. | 257/444 |
| 2005/0146934 A1 | | 7/2005 | Forbes et al. | 365/185.12 |

* cited by examiner

*Primary Examiner*—Joseph Chang
(74) *Attorney, Agent, or Firm*—Mark C. Pickering

(57) ABSTRACT

A synchronous clock signal is generated in a large number of local clock circuits at the same time by exposing photoconductive regions in each local clock circuit to a pulsed light source that operates at a fixed frequency. The photoconductive regions generate photoconductive currents which are sufficient to cause a logic inverter to switch states.

20 Claims, 2 Drawing Sheets

LASER POWERED CLOCK CIRCUIT WITH A SUBSTANTIALLY REDUCED CLOCK SKEW

RELATED APPLICATION

The present application is related to application Ser. No. 10/838,671 for Laser Powered Integrated Circuit by Peter Hopper et al. which is filed on an even date herewith.

BACKGROUND OF THE INVENTION

1. Field of the Invention

The present invention relates to clock circuits and, more particularly, to a laser powered clock circuit with a substantially reduced clock skew.

2. Description of the Related Art

Integrated circuits typically have clock circuits, commonly based on crystal oscillators, that generate and distribute synchronized clock signals to the various circuits within the integrated circuits. In most cases, a generated clock signal is distributed in parallel from a common clock node. In this case, a large number of clock lines extend away in parallel from the common clock node to the various circuits.

It is often the case that the physical lengths of the clock lines vary considerably due to the differing proximities of the circuits to the common clock node. This, in turn, means that an edge of the clock signal from the common clock node will arrive at the different circuits at slightly different times. This difference in propagation time can accumulate over additional gates, and lead to timing issues known as clock skew.

As a result, there is a need for a clock circuit that can generate and distribute a synchronized clock signal that substantially reduces or eliminates clock skew.

DETAILED DESCRIPTION OF THE INVENTION

Figure 1:
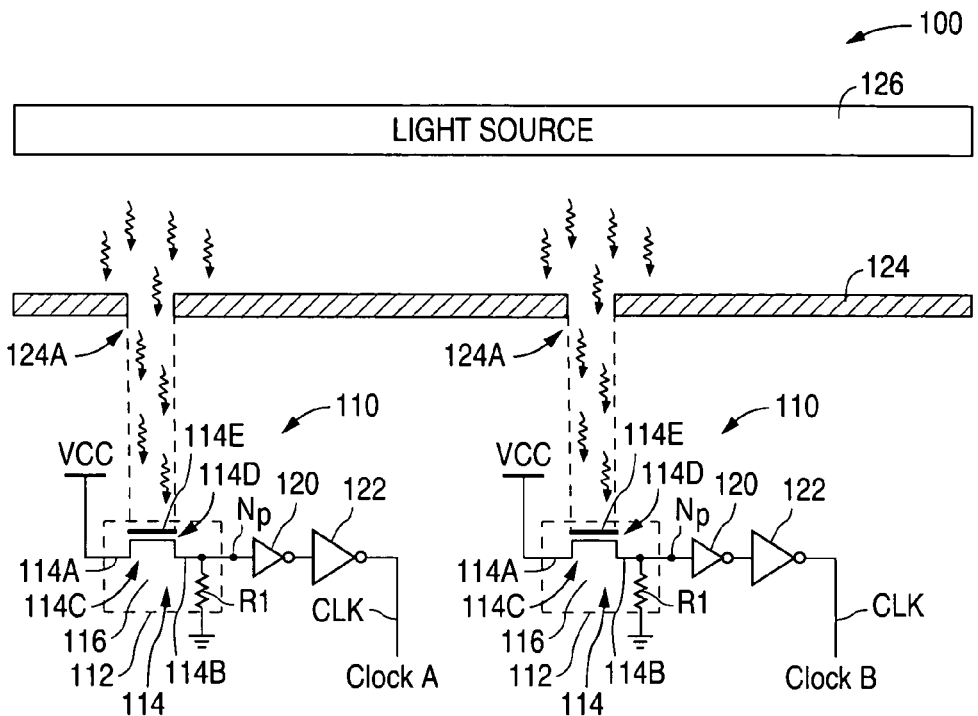
FIG. 1 is a schematic diagram illustrating an example of a laser powered clock system 100 in accordance with the present invention.

FIG. 1 shows a schematic diagram that illustrates an example of a laser powered clock system 100 in accordance with the present invention. As described in greater detail below, the clock circuit of the present invention utilizes the light energy from a pulsed laser, a large number of local clock circuits, and the photovoltaic effect to generate periodic voltage edges that are converted into a large number of synchronized local clock signals.

As shown in FIG. 1, clock system 100 includes a large number of physically and electrically-isolated local clock circuits 110 that each output a local clock signal CLK. In accordance with the present invention, the local clock signals CLK from the local clock circuits 110 are in phase and have substantially synchronous edges.

Each local clock circuit 110, in turn, has a photodetector stage 112 that converts received light energy into a clock current. In the FIG. 1 example, photodetector stage 112 is implemented with a photosensitive transistor 114 that has a photoconductive channel, and a resistor R1 that is connected between transistor 114 and ground.

As shown, transistor 114 has spaced-apart first and second terminals 114A and 114B that are formed in a semiconductor body 116 of an opposite conductivity type, where the first terminal 114A is connected to a power supply voltage VCC and the second terminal 114B is connected to a pulsed node $N_P$.

In addition, photosensitive transistor 114 has a channel region 114C that is located between the first and second terminals 114A and 114B, an isolation region 114D that is formed on channel region 114C, and a polysilicon gate 114E that is formed on isolation region 114D. Further, resistor R1 is connected between second terminal 114B and ground.

Each local clock circuit 110 also has a first inverter 120 and a second inverter 122. Each first inverter 120, which is formed with relatively small p and n-channel devices, has an input connected to the pulsed node $N_P$, and an output. Each second inverter 122, which is formed with p and n-channel devices that are larger than the devices of inverter 120, has an input connected to the output of a first inverter 120, and an output that generates the local clock signal CLK.

As further shown in FIG. 1, in addition to the local clock circuits 110, clock system 100 includes a metal layer 124 that is formed over the local clock circuits 110. Metal layer 124, in turn, has a number of openings 124A formed through metal layer 124 that are vertically aligned with the channel regions 114C of the photosensitive transistors 114 in the local clock circuits 110.

In addition, clock system 100 includes a light source 126 that, when turned on, illuminates the channel regions 114C such that the light energy from light source 126 is absorbed in the channel regions 114C. The wavelengths of light output by light source 126 include the wavelengths of light that have the highest likelihood of being absorbed in the channel regions 114C. For example, these wavelengths can include green and blue-green wavelengths of light. The intensities of the wavelengths of light output by light source 126 can also be varied to vary the number of charge carriers that are available to participate in the clock current flow.

In operation, when light source 126 is off and no light is present, photodetector stage 112 is turned off. As a result, the voltage on the input of inverter 120 is pulled down to ground via a pull-down current that flows through resistor R1. Resistor R1 can be implemented with a large resistance to minimize the magnitude of the pull-down current. When the voltage on the input of inverter 120 is low, the voltage on the input of inverter 122 is high while the voltage on the output of inverter 122 is low.

On the other hand, when light source 126 is turned on and light is present, photodetector stage 112 outputs the clock current. The clock current, in turn, pulls up the voltage on the input of inverter 120 faster than the pull-down current flowing through resistor R1 can pull down the voltage.

Specifically, the energy from the light, in the form of photons, illuminates the channel regions 114C. When the photons are absorbed in the illuminated channel regions 114C, enough new charge carriers are added to the channel regions 114C due to the photovoltaic effect so as to cause each of the photosensitive transistors 114 to turn on at substantially the same time and source the clock current. Since the clock current is larger than the pull-down current, the voltage on the input of inverter 220 rises. When the voltage on the input of inverter 120 is high, the voltage on the input of inverter 122 is low while the voltage on the output of inverter 122 is high.

The gates 114E of the photosensitive transistors 114 can also be biased to minimize the number of additional charge carriers that must be formed before the transistors 114 become conductive. (A larger clock current can be provided by using multiple photosensitive transistors that are formed in parallel, where each transistor sources a clock current to the pulsed node $N_P$.)

In the present invention, light source 126 is pulsed at a fixed frequency to output light energy in the form of photons in a direction that is substantially normal to the top surface of metal layer 124. The light is pulsed at less than a 50% duty cycle to allow the pull-down current sufficient time to pull down the voltage on the input of inverter 120 before the next pulse of light is received.

In addition, as noted above, the sizes of the p and n-channel transistors in the first inverter 120 are smaller than the p and n-channel transistors in the second inverter 122. The step up in size allows a relatively weak rough edge to be stepped up and cleaned up before it is output as a local clock signal CLK.

Thus, each time light source 126 is pulsed on, a rising edge is produced at a large number of local clock circuits 110 at substantially the same time. Depending on the required clock speed, the frequency of the edge generated by the local clock circuits 110 can be increased by, for example, connecting the output of inverter 122 to a ripple counter, or decreased by, for example, connecting the output of inverter 122 to a clock divider.

Figure 2:
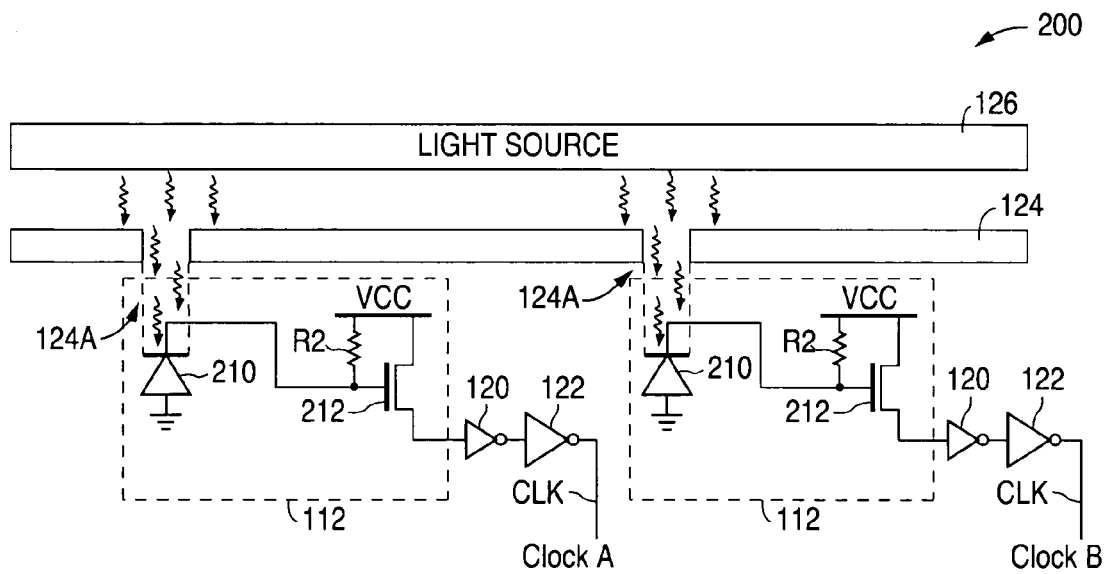
FIG. 2 is a schematic diagram illustrating an example of a laser powered clock system 200 in accordance with the present invention.

In addition to photosensitive transistor 114, photodetector stage 112 can also be implemented with other photosensitive circuits. FIG. 2 shows a schematic diagram that illustrates an example of a laser powered clock system 200 in accordance with the present invention. System 200 is similar to system 100 and, as a result, utilizes the same reference numerals to designate the structures which are common to both systems.

As shown in FIG. 2, system 200 differs from system 100 in that system 200 implements photodetector stage 112 with a resistor R2 that is connected to a supply voltage VCC, a photodiode 210 that is connected between the resistor R2 and ground, and a source-follower transistor 212 that is connected to the resistor R2 and the photodiode 210 to output the clock current.

In operation, when light source 126 pulses off and no light is present, the anode of photodiode 210 and the gate of source-follower transistor 212 are pulled up to the supply voltage VCC via a pull-up current that flows through resistor R2. Further, resistor R2 can be implemented with a large resistance to minimize the magnitude of the pull-up current.

On the other hand, when light source 126 pulses on and light is present, photodiode 210 pulls down the voltage on the anode of photodiode 210 faster than the pull-up current flowing through resistor R2 can pull up the voltage. As a result, the voltage on the gate of source-follower transistor 212 falls, thereby producing a change in the magnitude of the clock current that flows out of source-follower transistor 212.

Figure 3:
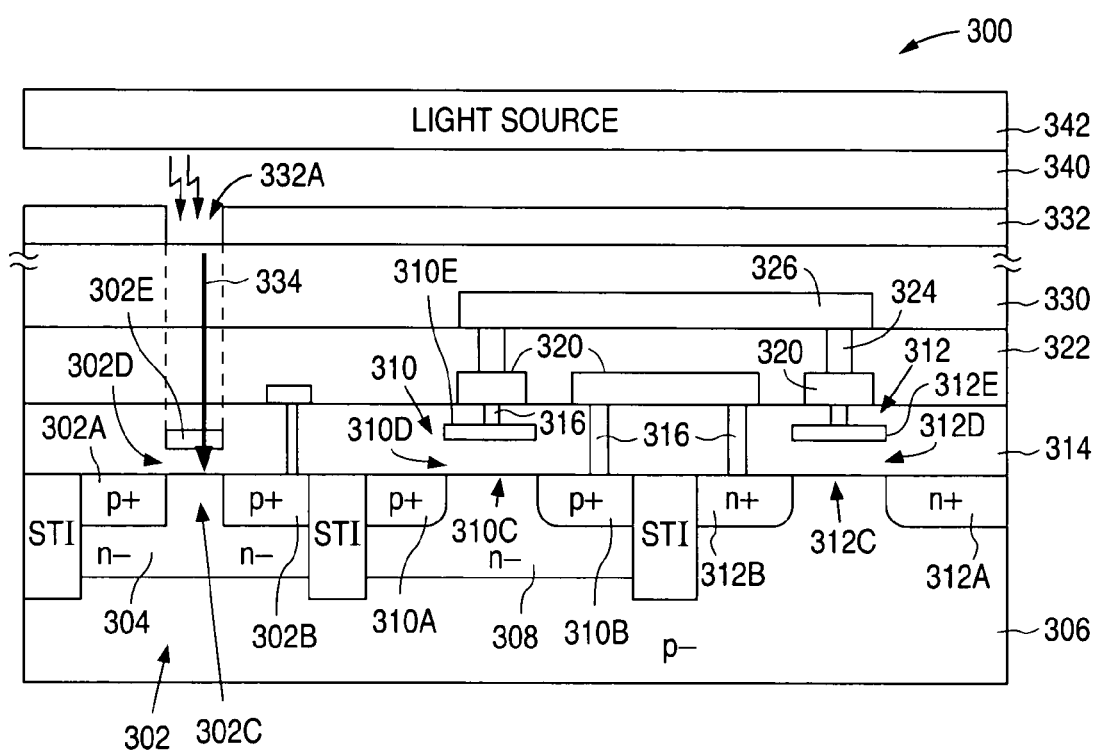
FIG. 3 is a cross-sectional diagram illustrating an example of a local clock circuit 300 of a laser powered clock system in accordance with the present invention.

FIG. 3 shows a cross-sectional diagram that illustrates an example of a local clock circuit 300 of a laser powered clock system in accordance with the present invention. As shown in FIG. 3, local clock circuit 300, which represents a partial implementation of clock system 100, includes a photosensitive transistor 302 that has spaced-apart p+ source and drain regions 302A and 302B that are formed in an n– semiconductor region 304, such as a well, and a channel region 302C that is located between source and drain regions 302A and 302B.

Channel region 302C, in turn, is formed to maximize the creation of photogenerated charge carriers. In addition, semiconductor region 304 is formed in a p– semiconductor substrate 306. Further, photosensitive transistor 302 also includes an isolation material 302D that is formed on channel region 302C, and a polysilicon gate 302E that is formed on isolation material 302D over channel region 302C.

In addition to photosensitive transistor 302, local clock circuit 300 also includes a number of inverters, including a first inverter that has an input connected to drain region 302B. The first inverter includes a PMOS transistor 310 that has spaced-apart p+ source and drain regions 310A and 310B that are formed in an n–semiconductor region 308, such as a well.

As further shown in FIG. 3, PMOS transistor 310 has a channel region 310C that is located between the source and drain regions 310A and 310B, an isolation material 310D that is formed on channel region 310C, and a gate 310E that is formed on isolation material 310D over channel region 310C.

In addition to PMOS transistor 310, the first inverter also includes an NMOS transistor 312 that has spaced-apart n+ source and drain regions 312A and 312B that are formed in p– semiconductor substrate 306, and a channel region 312C that is located between the source and drain regions 312A and 312B.

NMOS transistor 312 also has an isolation material 312D that is formed on channel region 312C, and a gate 312E that is formed on isolation material 312D over channel region 312C. Further, a number of shallow trench isolation (STI) regions are formed in p– substrate 306 to isolate laterally adjacent regions.

Local clock circuit 300 further includes a layer of insulation material 314 that is formed over the source and drain regions 302A/310A/312A and 302B/310B/312B, and the gates 302E/310E/312E of transistors 302, 310, and 312. Insulation material 314, which can be implemented with, for example, oxide, is substantially transparent to the wavelengths of light, e.g., green, that are directed at channel region 302C.

In addition, local clock circuit 300 includes a number of contacts 316 that are formed through insulation layer 314 to make electrical connections with the sources 302A/310A/312A, the drains 302B/310B/312B, and the gates 302E/310E/312E, and a number of metal-1 traces 320 that are formed on insulation layer 314 to make electrical connections with the contacts 316.

Further, local clock circuit 300 includes a layer of isolating material 322 that is formed on insulation material 314 over the metal-1 traces 320. Isolating material 322, which can be implemented with, for example, oxide, is substantially transparent to the wavelengths of light, e.g., green, that are directed at channel region 302C.

Local clock circuit 300 additionally includes a number of vias 324 that are formed through isolating layer 322 to make electrical connections with the metal-1 traces 320, and a number of metal-2 traces 326 that are formed on isolating layer 322 to make electrical connections with the vias 324.

Further, local clock circuit 300 includes a layer of protective material 330 that is formed over the isolating layer 322 and the metal-2 traces 326 (a number of layers of a metal interconnect structure can be connected to the metal-2 traces and lie between the metal-2 traces and protective layer 330), and a layer of metal 332 that is formed on protective layer 330. Protective material 330 is substantially transparent to the wavelengths of light, e.g., green, that are directed at channel region 302C.

In accordance with the present invention, metal layer 332 has an opening 332A that extends through metal layer 332. In the FIG. 3 example, the size of opening 332A is substantially the same as the size of channel region 302C, and opening 332A is vertically aligned with channel region 302C. (Opening 332A can be slightly offset to accommodate light rays which are slightly non-normal to the top surface of metal layer 332.)

In addition, in further accordance with the present invention, the metal interconnect structure is formed such that a substantially optically transparent pathway 334 can extend from opening 332A to channel region 302C in a direction that is normal (or near normal) to the top surface of metal layer 332. (Doped polysilicon, such as gate 302E, is relatively transparent to green and blue-green wavelengths of light.)

Thus, when a large number of channel regions in an integrated circuit are to be illuminated, metal layer 332 can have a corresponding number of openings that expose, and are substantially vertically aligned with, the channel regions of the photosensitive transistors of the local clock circuits. Further, the metal interconnect structure is formed such that a substantially optically transparent pathway extends from each opening in metal layer 332 to the channel regions of the photosensitive transistors in a direction that is normal to the top surface of metal layer 332.

As a result, metal layer 332 provides openings for a number of substantially optically transparent (to a wavelength of light) paths that extends from the openings to the channel regions, while at the same time blocking light rays that are normal to the top surface of metal layer 332 from reaching the remaining portions of circuit 300, e.g., the source and drains of transistors 302, 310, and 312, and the gates of transistors 110 and 112.

As further shown in, FIG. 3, local clock circuit 300 includes a spacer material 340 that is formed on metal layer 332 and the layer of protective material 330 exposed by opening 332A, and a light source 342 that is formed on spacer material 340. Spacer material 340 is substantially transparent to the wavelengths of light, e.g., green, that are directed at channel region 302C.

Light source 342, in turn, can be implemented with, for example, a green light-emitting diode (LED) either alone or in combination with a lens arrangement that directs light over a broader area. (The lens structures required to transform a narrow beam of light from an LED into a broad beam of light are well known in the art.) A single light source, or multiple light sources, can be used to illuminate substantially all of the surface of an integrated circuit.

Thus, one of the benefits of the present invention is that the photovoltaic effect can be used to supply the charge carriers needed to form the clock currents in a large number of local clock circuits that are located all over the integrated circuit. As a result, synchronous clock signals can be generated all over the integrated circuit with minimal routing. Since synchronous clock signals can be generated all over an integrated circuit with minimal, the clock skew is substantially reduced or eliminated.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A light powered clock system formed in a semiconductor material of a first conductivity type, the semiconductor material having a top surface, the light powered clock system comprising:
   a local clock circuit including:
      a first region of a second conductivity type that contacts the top surface of the semiconductor material, the first region including all contiguous regions of the second conductivity type;
      a second region of the second conductivity type that contacts the top surface of the semiconductor material, the second region being spaced apart from the first region, and including all contiguous regions of the second conductivity type; and
      a semiconductor region of the semiconductor material that lies between and contacts the first and second regions, the semiconductor region receiving light energy from a pulsed light source, the pulsed light source having a fixed frequency.

2. The light powered clock system of claim 1 wherein the local clock circuit further includes a current-to-voltage circuit electrically connected to the second region to generate a clock signal.

3. The light powered clock system of claim 2 wherein the current-to-voltage circuit includes:
   a resistive element connected to the second region and ground;
   a first inverter having an input connected the second region, and an output; and
   a second inverter having an input connected to the output of the first inverter, and an output that generates the clock signal.

4. The light powered clock system of claim 1 and further comprising:
   a transistor having:
      a body of the first conductivity type;
      a source region of the second conductivity type that contacts the body;
      a drain region of the second conductivity type that contacts the body, the drain region being spaced apart from the source region;
      a channel area located between the source and drain regions; and
      a gate formed over and isolated from the channel area; and
   an insulation region that contacts the first region, the second region, the source region, and the drain region, the channel area receiving no light energy from the pulsed light source.

5. The light powered clock system of claim 4 and further comprising a layer of metal formed over the insulation region, the layer of metal having a top surface and an opening that lies substantially vertically over the semiconductor region.

6. The light powered clock system of claim 1 wherein the pulsed light source includes a light emitting diode.

7. The light powered clock system of claim 1 and further comprising a plurality of regional clocking circuits, each regional clocking circuit and the local clock circuit being substantially identical.

8. A light powered clock system formed in a semiconductor material of a first conductivity type, the light powered clock system comprising:
a local clock circuit including:
a first region of a second conductivity type that contacts the semiconductor material;
a second region of the second conductivity type that contacts the semiconductor material, the second region being spaced apart from the first region; and
a semiconductor region of the semiconductor material that lies between and contacts the first and second regions, the semiconductor region receiving light energy from a pulsed light source, the pulsed light source having a fixed frequency, a current flowing from the first region to the second region through the semiconductor region only in response to the semiconductor region receiving light energy from the pulsed light source.

9. The light powered clock system of claim 8 wherein the local clock circuit further includes a current-to-voltage circuit electrically connected to the second region to generate a clock signal in response to the current.

10. The light powered clock system of claim 9 wherein the current-to-voltage circuit includes:
a resistive element connected to the second region and ground;
a first inverter having an input connected the second region, and an output; and
a second inverter having an input connected to the output of the first inverter, and an output that generates the clock signal.

11. The light powered clock system of claim 8 and further comprising:
a transistor having:
a body of the first conductivity type;
a source region of the second conductivity type that contacts the body;
a drain region of the second conductivity type that contacts the body, the drain region being spaced apart from the source region;
a channel area located between the source and drain regions; and
a gate formed over and isolated from the channel area; and
an insulation region that contacts the first region, the second region, the source region, and the drain region, the channel area receiving no light energy from the pulsed light source.

12. The light powered clock system of claim 11 and further comprising a layer of metal formed over the insulation region, the layer of metal having a top surface and an opening that lies substantially vertically over the semiconductor region.

13. The light powered clock system of claim 8 wherein the pulsed light source includes a light emitting diode.

14. The light powered clock system of claim 8 wherein the pulsed light source includes a light emitting diode and a lens structure.

15. The light powered clock system of claim 8 and further comprising a plurality of regional clocking circuits, each regional clocking circuit and the local clock circuit being substantially identical.

16. The light powered clock system of claim 8 wherein the local clock circuit further includes a gate formed over and isolated from the semiconductor region.

17. A method of generating a synchronous clock signal across an integrated circuit, the integrated circuit having:
a plurality of local clock circuits, each local clock circuit having:
a first region of a second conductivity type that contacts a semiconductor material of a first conductivity type;
a second region of the second conductivity type that contacts the semiconductor material, the second region being spaced apart from the first region; and
a semiconductor region of the semiconductor material that lies between and contacts the first and second regions, the semiconductor region receiving light energy from a light source,
the method comprising:
applying a voltage to the first region of each local clock circuit; and
pulsing the light source at a fixed frequency, a current flowing from the first region to the second region through the semiconductor region of each local clock circuit only in response to light energy from the pulsed light source.

18. The method of claim 17 wherein the integrated circuit further has:
a transistor having:
a body of the first conductivity type;
a source region of the second conductivity type that contacts the body;
a drain region of the second conductivity type that contacts the body, the drain region being spaced apart from the source region;
a channel area located between the source and drain regions; and
a gate formed over and isolated from the channel area; and
an insulation region that contacts the first region, the second region, the source region, and the drain region.

19. The method of claim 18 and further comprising protecting the channel area so that the channel area receives no light energy from the pulsed light source.

20. The method of claim 17 wherein:
the first region contacts a top surface of the semiconductor material, and includes all contiguous regions of the second conductivity type; and
the second region contacts the top surface of the semiconductor material, and includes all contiguous regions of the second conductivity type.

* * * * *